United States Patent
Chiu et al.

(10) Patent No.: US 9,213,642 B2
(45) Date of Patent: Dec. 15, 2015

(54) HIGH AVAILABILITY CACHE IN SERVER CLUSTER

(71) Applicant: International Business Machines Corporation, Armonk, NY (US)

(72) Inventors: Lawrence Y. Chiu, Saratoga, CA (US); Yang Liu, Shanghai (CN); Paul H. Muench, San Jose, CA (US); Timothy L. Toohey, Autsin, TX (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 14/159,151

(22) Filed: Jan. 20, 2014

(65) Prior Publication Data

US 2015/0205722 A1    Jul. 23, 2015

(51) Int. Cl.
  *G06F 11/00* (2006.01)
  *G06F 12/08* (2006.01)
  *G06F 12/12* (2006.01)
  *G06F 11/20* (2006.01)

(52) U.S. Cl.
  CPC ........ *G06F 12/0828* (2013.01); *G06F 11/2038* (2013.01); *G06F 11/2043* (2013.01); *G06F 11/2046* (2013.01); *G06F 11/2048* (2013.01); *G06F 12/121* (2013.01); *G06F 2211/1009* (2013.01); *G06F 2212/621* (2013.01); *G06F 2212/69* (2013.01)

(58) Field of Classification Search
  None
  See application file for complete search history.

(56) References Cited

U.S. PATENT DOCUMENTS

| | | | |
|---|---|---|---|
| 6,665,705 B1* | 12/2003 | Daniels-Barnes et al. | 709/203 |
| 7,149,922 B2 | 12/2006 | Sonoda et al. | |
| 7,836,020 B1* | 11/2010 | Rao et al. | 707/649 |
| 8,904,117 B1* | 12/2014 | Kalekar et al. | 711/143 |
| 2007/0294564 A1 | 12/2007 | Reddin et al. | |
| 2009/0300408 A1* | 12/2009 | Ash et al. | 714/5 |
| 2011/0072217 A1* | 3/2011 | Hoang et al. | 711/130 |
| 2011/0202708 A1 | 8/2011 | Ash et al. | |
| 2012/0102268 A1 | 4/2012 | Smith et al. | |
| 2012/0215970 A1* | 8/2012 | Shats | 711/103 |
| 2013/0144842 A1* | 6/2013 | Li et al. | 707/674 |
| 2014/0173330 A1* | 6/2014 | Samanta et al. | 714/4.11 |

OTHER PUBLICATIONS

Weil, Sage A., et al., "Ceph: A scalable, high-performance distributed file system," Proceedings of the 7th symposium on Operating systems design and implementation, USENIX Association, 2006.

* cited by examiner

*Primary Examiner* — Gabriel Chu
(74) *Attorney, Agent, or Firm* — Kunzler Law Group

(57) ABSTRACT

For a high availability cache, a cache module obtains permission to manage the cache in response to a failover event in a server cluster by communicating a cache coherency token. An update module rebuilds a cache directory from data stored in the cache and accesses the cache without reloading the data stored in the cache.

20 Claims, 8 Drawing Sheets

HIGH AVAILABILITY CACHE IN SERVER CLUSTER

FIELD

The subject matter disclosed herein relates to a high availability cache and more particularly relates to a high availability cache in a server cluster.

BACKGROUND

Description of the Related Art

Server clusters employ redundant servers and storage systems to increase reliability. The server clusters also employ caches to decrease data latency.

BRIEF SUMMARY

An apparatus for a high availability cache in a server cluster is disclosed. The apparatus includes a cache module and an update module. The cache module obtains permission to manage the cache in response to a failover event in the server cluster by communicating a cache coherency token. The update module rebuilds a cache directory from data stored in the cache and accesses the cache without reloading the data stored in the cache. A method and computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
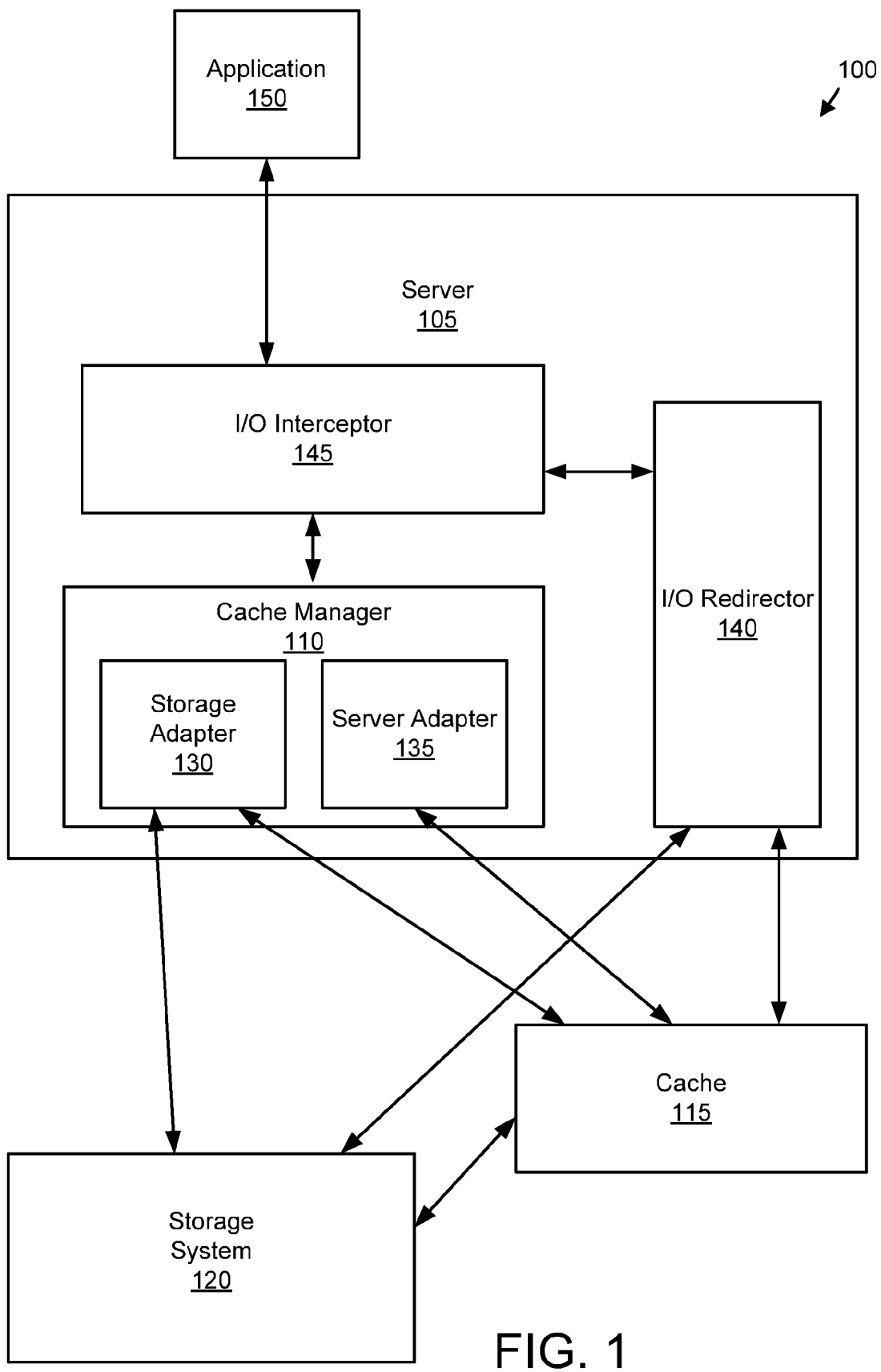
FIG. 1 is a schematic block diagram illustrating one embodiment of a server system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic block diagram illustrating one embodiment of a server system 100. The system 100 includes a server 105, a storage system 120, and a cache 115. The server 105 may execute transactions for an application 150. The application 150 may be a database application, an enterprise management application, a commerce application, or the like.

The server 105 may employ data stored by the storage system 120 to execute the transactions. The storage system 120 may include one or more hard disk drives, optical storage devices, micromechanical storage devices, or combinations thereof.

The system 100 may cache data from the storage system 120 in the cache 115 in order to reduce the latency of accessing the data. The cache 115 may be a semiconductor storage device with low latency. The cache 115 may store less data than the storage system 120, but may have a much lower latency than the storage system 120

The server 105 may include an input/output (I/O) interceptor 145, an I/O redirector 140, and a cache manager 110 to manage the caching of data in the cache 115. The cache manager 110 may include a storage adapter 130 and a server adapter 135.

In one embodiment, the application 150 issues an I/O request for first data from the storage system 120. Alternatively, the server 105 may issue the I/O request for the first data. The I/O request may be a data read, the data write, a data delete, or the like. The I/O interceptor 145 may detect the I/O request. In addition, the I/O interceptor 145 may query the cache manager 110 to determine if the first data is cached in the cache 115. The cache manager 110 may maintain a cache directory of all data in the cache 115.

If the first data is cached, the I/O interceptor 145 may notify the I/O redirector 140. The I/O redirector 140 may redirect the I/O request to the cache 115. The cache 115 may fulfill the I/O request. By using the cache 115 to provide a low latency data access, the performance of the server 105 is significantly accelerated.

Alternatively, if the cache manager 110 reports that the first data is not cached in the cache 115, the server 105 communicates the I/O request to the storage system 120 and the storage system 120 accesses the first data. In addition, the cache manager 110 may determine whether the first data should be cached in the cache 115. If the cache manager 110 determines that the first data should be cached in the cache 115, the storage adapter 130 may direct the storage system 120 to cache the first data in the cache 115.

Figure 2A:
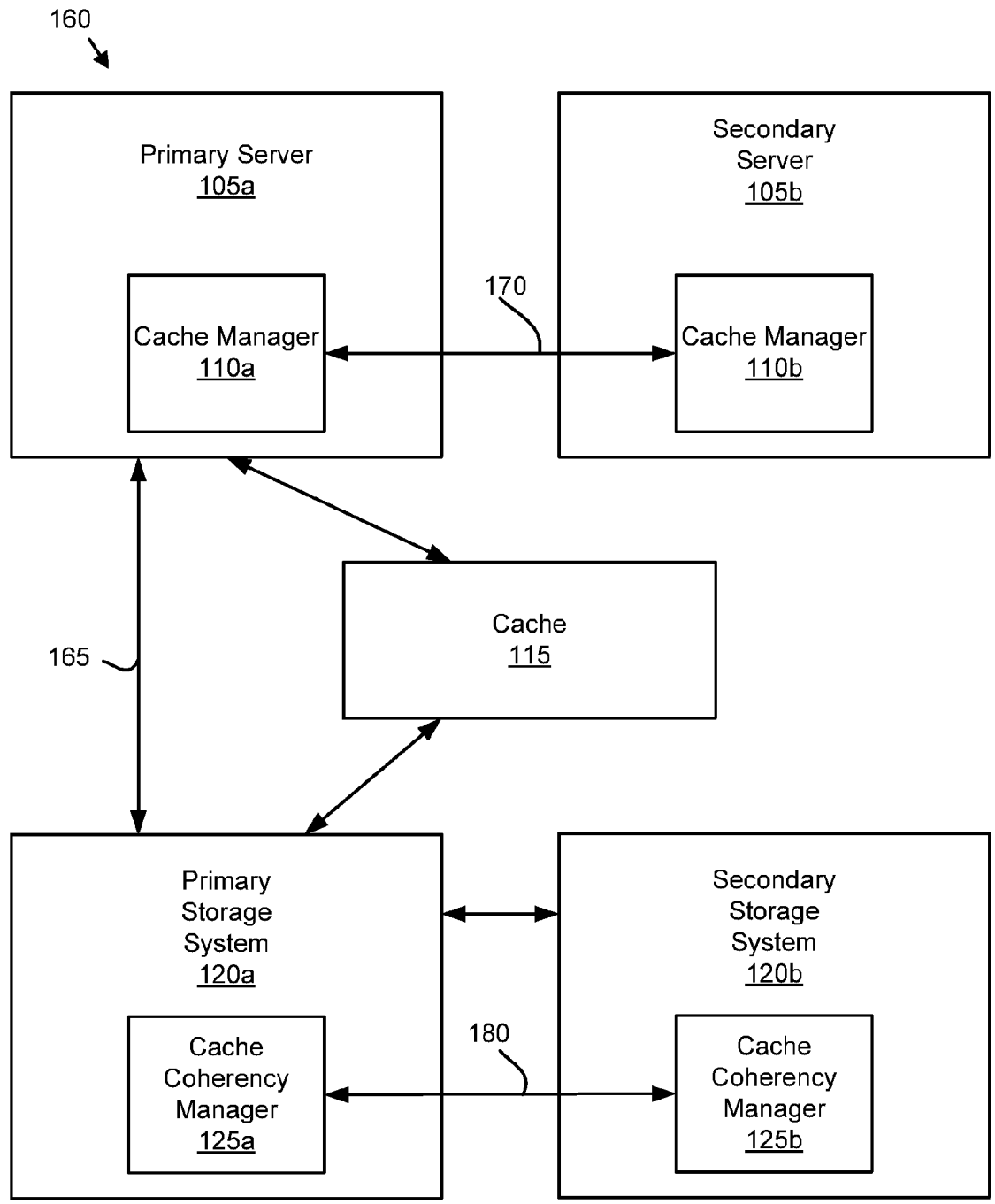
FIG. 2A is a schematic block diagram illustrating one embodiment of a server cluster.

FIG. 2A is a schematic block diagram illustrating one embodiment of a server cluster 160. The server cluster 160 may include a plurality of servers 105 and a plurality of storage systems 120. In the depicted embodiment, the server cluster 160 includes two servers 105 and two storage systems 120. In one embodiment, a primary server 105a executes transactions for the application 150. The primary storage system 120a may store the data for the transactions.

If the primary server 105a fails, the server cluster 160 may failover from employing the primary server 105a to execute transactions to employing the secondary server 105b to execute the transactions. In the past, when a failover from the primary server 105a to a secondary server 105b occurred, the cache manager 110b of the secondary server 105b was unable to manage the data in the cache 115. The data of the cache 115 may be invalidated because the cache manager 110b of the secondary server 105b is unable to manage the data in the cache 115. As a result, the second cache manager 110b would be forced to reload all of the data in the cache 115 before the cache 115 could be employed.

Unfortunately, reloading the data of the cache 115 may require significant processing bandwidth from the secondary server 105b. In addition, because the cache 115 will be less likely to store the data of an I/O request until the cache 115 is fully reloaded with valid data, the performance of the secondary server 105b may be diminished until the second cache manager 110b reloads the cache 115.

The embodiments described herein obtain permission for managing the cache 115 in response to a failover event by communicating a cache coherency token. In addition, the embodiments rebuild the cache directory for the cache 115 from data stored in the cache 115 and access the cache 115 without reloading the data stored in the cache 115. As a result, the cache 115 is rapidly available for use by the secondary server 105b without reloading the cache 115 with valid data as will be described hereafter.

A secondary storage system 120b may mirror the primary storage system 120a. For example, each I/O request that modifies data in the primary storage system 120a may be mirrored to the secondary storage system 120b. Thus the secondary storage system 120b is synchronized with the primary storage system 120a. If the primary storage system 120a fails, the server cluster 160 may perform a failover and transition from employing the primary storage system 120a to employing the secondary storage system 120b.

In the past, when the server cluster 160 performed a failover from the primary storage system 120a to the secondary storage system 120b, the cache manager 110a may be unable to employ the cache 115 until the cache data is reloaded from the secondary storage system 120b. As a result, the performance of the primary server 105a using the secondary storage system 120b is degraded until the cache 115 is reloaded.

The embodiments described herein maintain cache coherency between the primary storage system 120a and the secondary storage system 120b. The primary storage system 120a and the secondary storage system 120b may each include a cache coherency manager 125 that maintain the data within the storage systems 120 and within the cache 115 so that in the event of a failover from the primary storage system 120a to the secondary storage system 120b, the cache 115 may be rapidly used without invalidating the cache data and reloading the cache 115 with data from the secondary storage system 120b as will be described hereafter.

In one embodiment wherein the primary server 105a accesses data from the primary storage system 120a with the secondary storage system 120b mirroring the primary storage system 120a, the first cache manager 110a of the primary server 105a may receive a cache coherency token from the cache coherency manager 125a of the primary storage system 120a. The cache manager 110a may request the cache coherency token from the cache coherency manager 125a in response to the cache manager 110a managing the cache 115. The cache manager 110a may also request a second cache coherency token from the cache coherency manager 125b of the secondary storage system 120b. The cache manager 110a may use the second cache coherency token to communicate with the second cache coherency manager 125b of the secondary storage system 120b. Alternatively, the cache coherency manager 125a of the primary server 105a may also share 180 the cache coherency token with the cache coherency manager 125b of the secondary storage system 120b.

In one embodiment, the first cache manager 110a communicates 165 the cache coherency token to the cache coherency manager 125a to indicate that the cache manager 110a has permission to manage the cache 115. The first cache manager 110a of the primary server 105a may share 170 the cache coherency token with the second cache manager 110b of the secondary server 105b. The second cache manager 110b of the secondary server 105b may use the cache coherency token to obtain permission to manage the cache or 115 in response to a failover event as will be described hereafter.

Figure 2B:
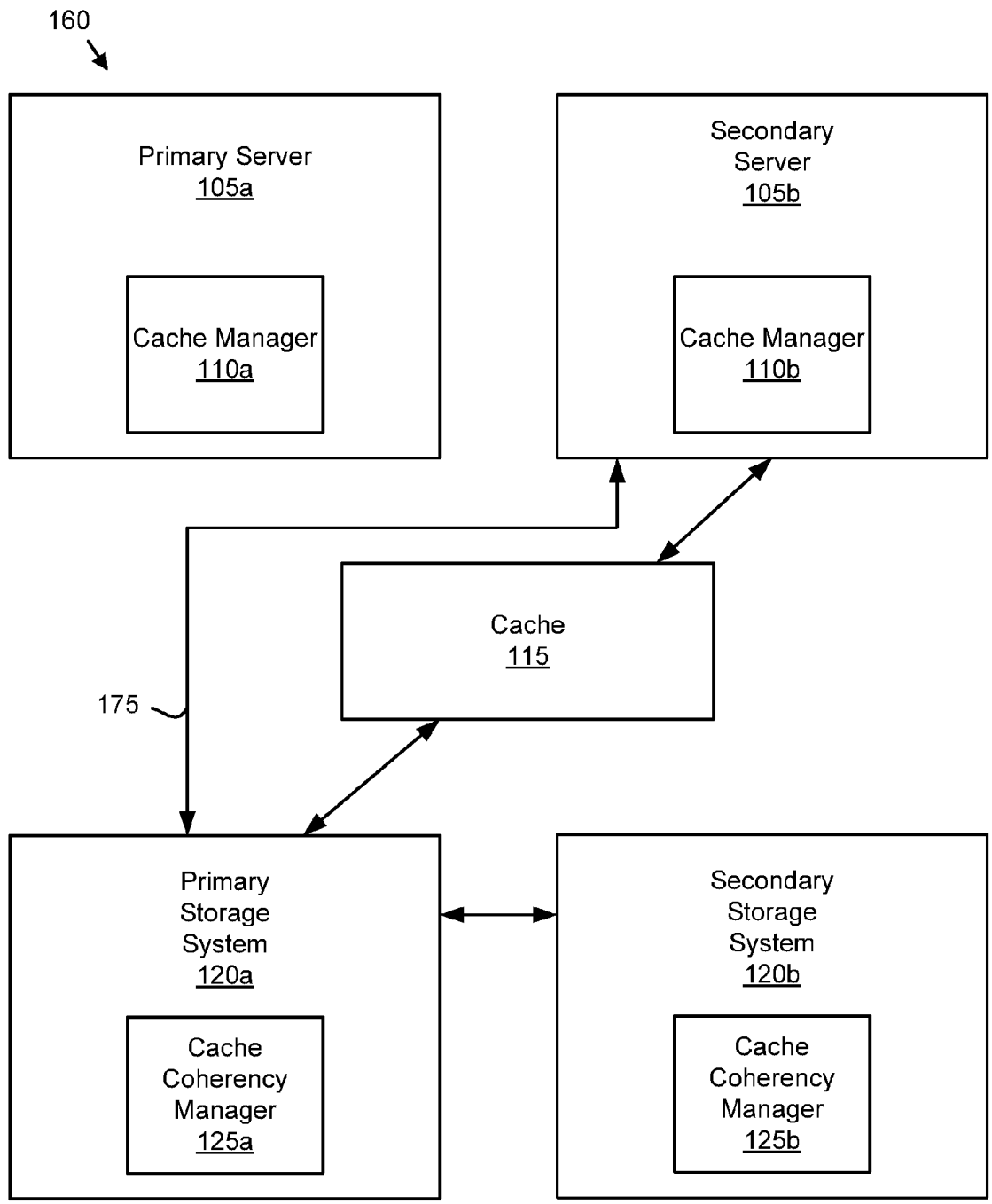
FIG. 2B is a schematic block diagram illustrating one embodiment of server failover.

FIG. 2B is a schematic block diagram illustrating one embodiment of server cluster failover of the primary server 105a. The server cluster 160 is the server cluster 160 of FIG. 2A after the primary server 105a has failed. In response to the failure of the primary server 105a, the secondary server 105b executes transactions for the application 150 in place of the primary server 105a including transacting I/O requests directed to the primary storage system 120a.

In one embodiment, the secondary server 105a is notified of the failure of the primary server 105a. Alternatively, the secondary server 105b may detect the failure of the primary server 105a. The primary server 105a may be quiesced.

The cache manager 110b of the secondary server 105b may obtain permission to manage the cache 115 in response to the failover event in the server cluster 160 by communicating 175 the cache coherency token received from cache manager 110a of the primary server 105a to the cache coherency manager 125a of the primary storage system 120a.

The cache coherency manager 125a of the primary storage system 120a may compare the cache coherency token received from the cache manager 110b of the secondary server 105b with the cache coherency token that the cache coherency manager 125a of the primary storage system 120a generated. If the cache coherency tokens match, the cache coherency manager 125a of the primary storage system 120a may grant the cache manager 110*b* of the secondary server 105*b* permission to manage the cache 115.

The cache coherency manager 125*a* of the primary storage system 120*a* may recognize that the second cache manager 110*b* of the secondary server 105*b* has permission to manage the cache 115 and direct communications 175 for maintaining cache coherency to the cache manager 110*b* of the secondary server 105*b*.

The second cache manager 110*b* of the secondary server 105*b* may rebuild the cache directory from data stored in the cache 115. However, the second cache manager 110*b* does not reload the data in the cache 115. The second cache manager 110*b* may begin accessing the cache 115 as soon as the cache directory is rebuilt, so that the secondary server 105*b* executes transactions using the cached data soon after the failover. As a result, there is minimal performance degradation during the failover from the primary server 105*a* to the secondary server 105*b*.

Figure 2C:
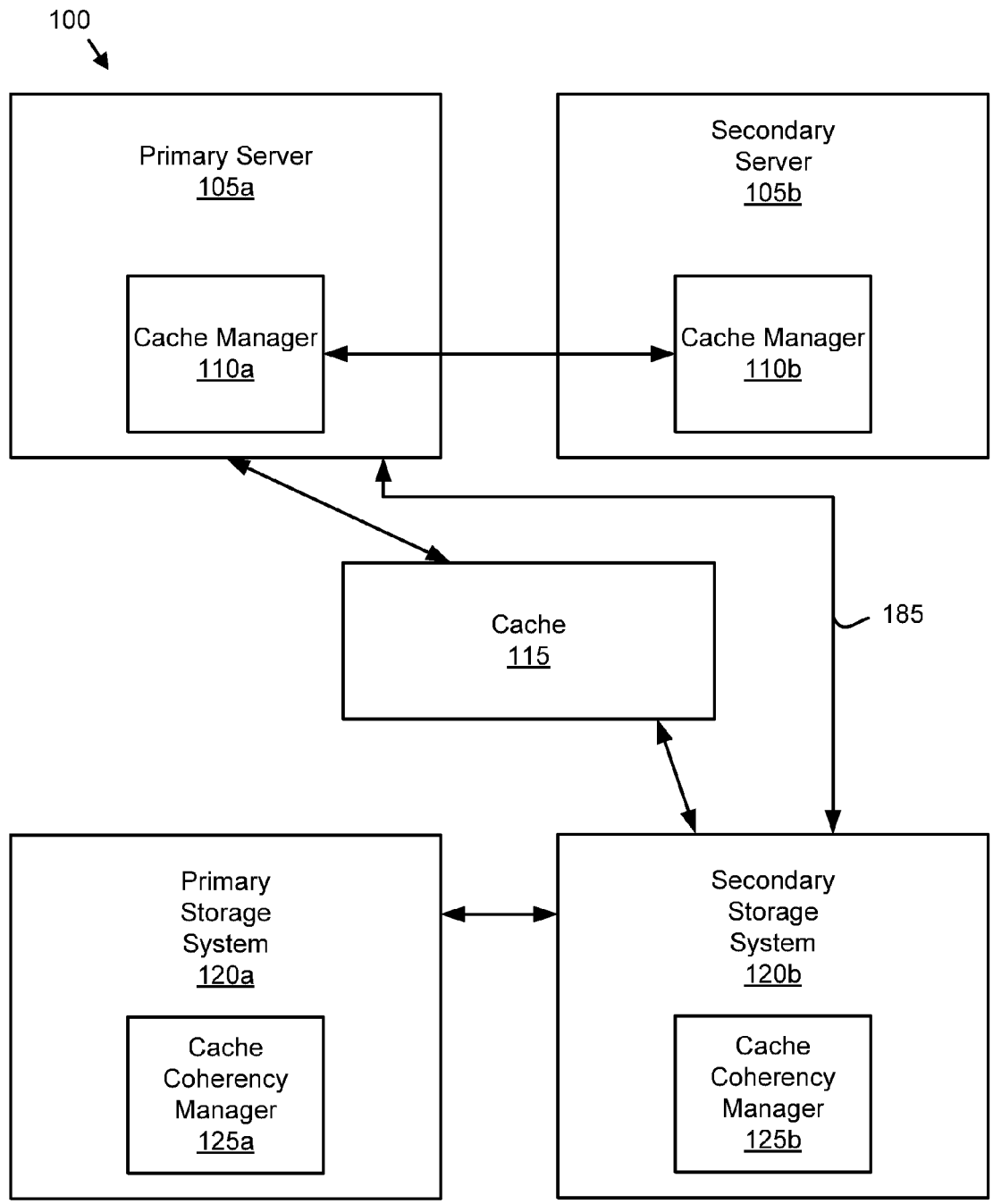
FIG. 2C is a schematic block diagram illustrating one embodiment of storage system failover.

FIG. 2C is a schematic block diagram illustrating one embodiment of server cluster failover of the primary storage system 125*a*. In the depicted embodiment, the primary storage system 125*a* has failed. The primary server 105*a* may detect the failure of the primary storage system 125*a* and initiate the failover of the primary storage system 125*a*. Alternatively, the primary storage system 125*a* may detect an imminent failure of the primary storage system 125*a* and notify the primary server 105*a*.

In one embodiment, the primary server 105*a* may notify the secondary storage system 120*b* that the secondary storage system 120*b* will store the data for the server cluster 160 and will no longer mirror the primary storage system 120*a*. In addition, the first cache manager 110*a* of the primary server 105*a* may obtain permission to manage the cache 115 in response to the failover event by communicating 185 the second cache coherency token to the cache coherency manager 125*b* of the secondary storage system 120*b*.

The cache coherency manager 125*b* of the secondary storage system 120*b* may compare the cache coherency token received from the cache manager 110*a* of the primary server 105*a* with the second cache coherency token. If the cache coherency tokens match, the cache coherency manager 125*b* of the secondary storage system 120*b* may grant the cache manager 110*a* of the primary server 105*a* permission to manage the cache 115.

The cache coherency manager 125*b* of the secondary storage system 120*b* may recognize that the cache manager 110*a* of the primary server 105*a* has permission to manage the cache 115 and direct communications 185 for maintaining cache coherency to the cache manager 110*a* of the primary server 105*a*.

The cache manager 110*a* of the primary server 105*a* may rebuild the cache directory from data stored in the cache 115. In one embodiment, the cache manager 110*a* rebuilds the cache directory by replacing a primary storage system volume identifier with a secondary storage system volume identifier for each cache line of the cache 115.

However, the cache manager 110*a* does not reload the data in the cache 115. The cache manager 110*a* may begin accessing the cache 115 as soon as the cache directory is rebuilt, so that the primary server 105*a* executes transactions using the cached data soon after the failover. As a result, there is minimal performance degradation during the failover from the primary storage system 120*a* to the secondary storage system 120*b*.

Figure 3:
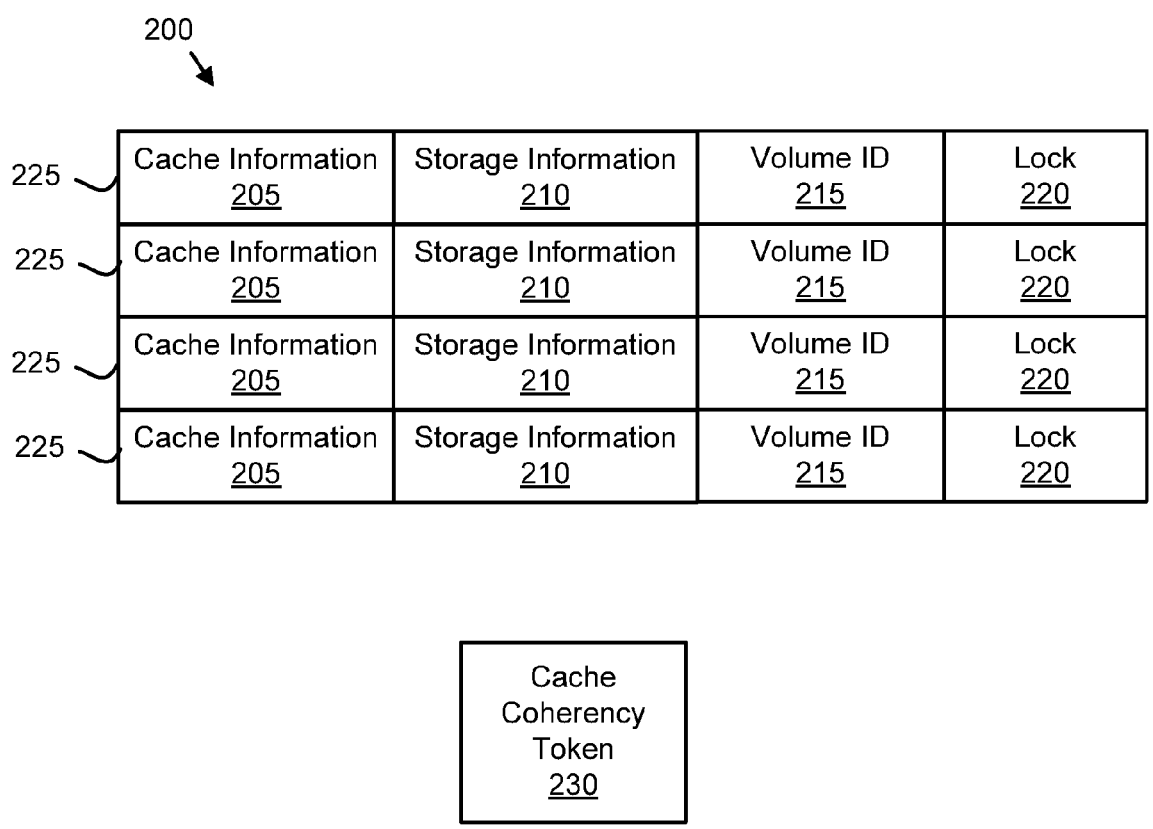
FIG. 3 is a schematic block diagram illustrating one embodiment of a cache directory and cache coherency token.

FIG. 3 is a schematic block diagram illustrating one embodiment of a cache directory 200 and cache coherency token 230. The cache directory 200 and cache coherency token 230 may be stored in a memory of a server 105. A cache manager 110 may maintain the cache directory 200. The cache directory 200 may be organized as a database, as a plurality of linked data structures, as a flat file, or combinations thereof. In the depicted embodiment, the cache directory 200 includes a plurality of entries 225. Each entry 225 may store information for a cache line of the cache 115. Each entry 225 may include cache information 205, storage information 210, a volume identifier 215, and a lock 220.

The cache information 205 may include a number of accesses of the cache line, a frequency of accesses, a priority of the data in the cache line, and the like. The cache information 205 may be used to determine whether the data should be stored in the cache line or flushed to a storage system 120.

The storage information 210 may identify the storage system 120 that stores the data of the cache line. The volume identifier 215 may identify the logical volume of the storage system 120 that stores the data of the cache line.

In one embodiment, the lock 220 indicates whether the data of the entry 225 is valid. The lock 220 may be cleared if the data is valid. However, if the server 105 and/or storage system 120 modifies the data associated with the entry in the storage system 120, the lock 220 may be set to indicate that the data is invalid and to prevent the cache line associated with the entry 225 from being accessed. The active cache manager 110 and active cache coherency manager 125 may manage the locks 220.

As used herein, an active cache manager 110 is currently managing the cache 115. A cache manager 110 that is not currently managing the cache 115 may be an inactive cache manager 110. The active cache coherency manager 125 is the cache coherency manager 125 for the storage system 120 that is actively providing data for a server 105 and/or application 150. In contrast, the cache coherency manager 125 for storage system 120 that is mirroring another storage system 120 and/or has failed is an inactive cache coherency manager 125. The mirroring storage system 120 may be referred to as a synchronized storage system 120.

The cache coherency token 230 may be an alphanumeric string, a binary string, a timestamp, a hash, a secure token, an encryption key, a logical address, a physical address, or combinations thereof. The cache coherency token 230 may be stored in a register, a file, a database entry, a data structure, or the like. In one embodiment, the cache coherency manager 125 for the active storage system 120 generates the cache coherency token 220 for data that is stored in the cache 115. The cache coherency manager 125 for the active storage system 120 may share the cache coherency token 230 with the active cache manager 110 and the cache coherency manager 125 of the synchronized storage system 120.

Figure 4:
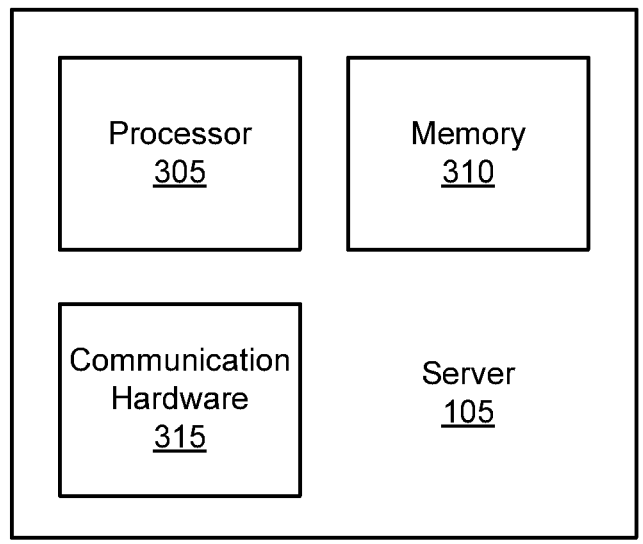
FIG. 4 is a schematic block diagram illustrating one embodiment of a server.

FIG. 4 is a schematic block diagram illustrating one embodiment of a server 105. The server 105 includes a processor 305, a memory 310, and communication hardware 315. The memory 310 may be a semiconductor storage device, a hard disk drive, an optical storage device, a micromechanical storage device, or combinations thereof. The memory 310 may store program code. The processor 305 may execute the program code. The communication hardware 315 may communicate with other devices. For example, the server 105 may be the primary server 105*a* and may employ the communication hardware 315 to communicate with a secondary server 105*b* and/or the primary storage system 120*a* or the secondary storage system 120*b*.

Figure 5:
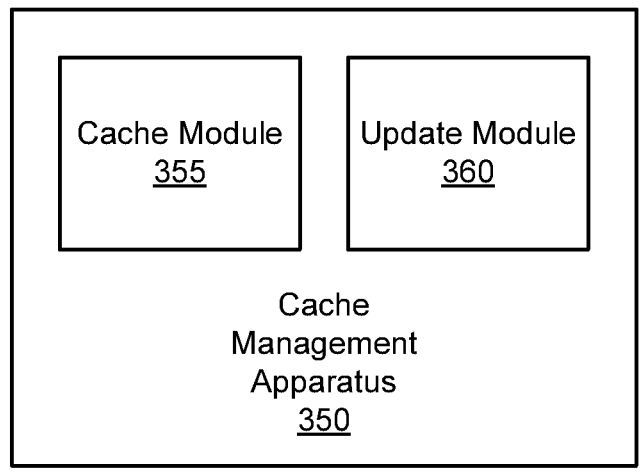
FIG. 5 is a schematic block diagram illustrating one embodiment of a cache management apparatus.

FIG. 5 is a schematic block diagram illustrating one embodiment of a cache management apparatus 350. The cache management apparatus 350 may be embodied in the server cluster 160, including one or more primary servers 105a and one or more secondary servers 105b. In one embodiment, the cache management apparatus 350 is embodied in one or more of the cache managers 110 and one or more of the cache coherency managers 125.

The cache management apparatus 350 includes a cache module 355 and an update module 360. The cache module 355 and the update module 360 may comprise one or more of hardware and program code. The program code may be stored on one or more computer readable storage media such as the memory 310.

The cache module 355 may obtain permission to manage the cache 115 in response to a failover event in the server cluster 160 by communicating the cache coherency token 230 to the active cache coherency manager 125. The update module 360 may update the cache directory 200 from data stored in the cache 115. The update module 360 may further access the cache 115 without reloading the data stored in the cache 115.

Figure 6:
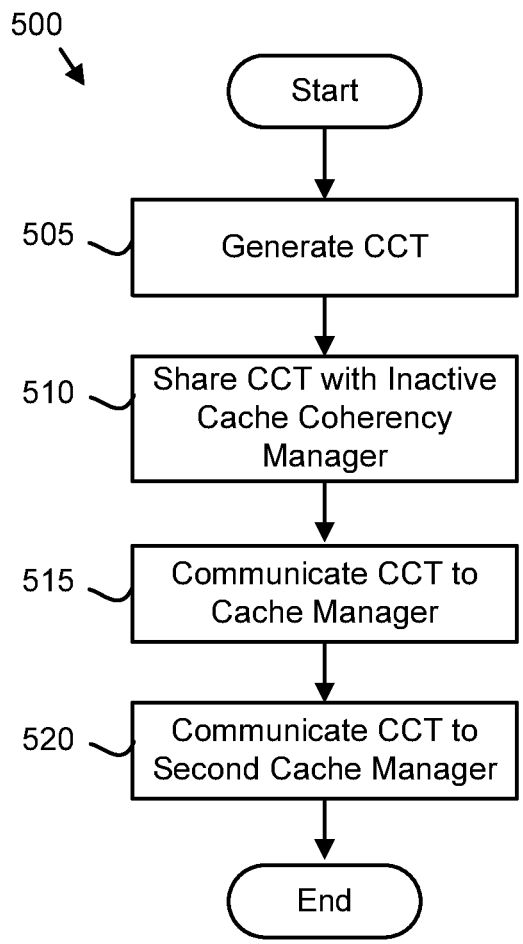
FIG. 6 is a schematic flow chart diagram illustrating one embodiment of a cache coherency token synchronization method.

FIG. 6 is a schematic flow chart diagram illustrating one embodiment of a cache coherency token synchronization method 500. The method 500 may generate and distribute the cache coherency token 230. The method 500 may perform the functions of the cache management apparatus 350 and/or the server cluster 160. The method 500 may be performed by the processor 305. Alternatively, the method 500 may be embodied in a computer program product. The computer program product may include a computer readable storage medium such as the memory 310. The computer readable storage media may have program code embodied therein. The program code may be readable/executable by the processor 305 to perform the functions of the method 500.

The method 500 starts, and in one embodiment, the cache module 355 generates 505 the cache coherency token 230. The cache module 355 may generate 505 the cache coherency token 230 from the active cache coherency manager 125. In one embodiment, the cache module 355 generates 505 a cache coherency token 230 comprising an alphanumeric string identifying the token and a timestamp. The cache coherency token 230 may be encrypted with an encryption key.

The cache of module 355 may share 510 the cache coherency token 230 from the active cache coherency manager 125 to the active cache coherency manager 125. For example, the cache coherency manager 125a of the primary storage system 120a may generate 505 the cache coherency token 230 and may share 510 the cache coherency token 230 with the cache coherency manager 125b of the secondary storage system 120b. The cache coherency manager 125b of the secondary storage system 120b may store the cache coherency token 230.

The cache module 355 may further communicate 515 the cache coherency token 230 to the active cache manager 110. The cache module 355 may communicate 515 the cache coherency token 230 from the active cache coherency manager 125 to the active cache manager 110. Continuing the example above, the cache coherency manager 125a of the primary storage system 120a may communicate the cache coherency token 230 to the first cache manager 110a of the primary server 105a.

The cache module 355 may communicate 520 the cache coherency token 230 from the active cache manager 110 to an inactive cache manager 110 and the method 500 ends. Continuing the example above, the first cache manager 110a of the primary server 105a may communicate the cache coherency token 230 to the second cache manager 110b of the secondary server 105b. The second cache manager 110b may store the cache coherency token 230 in a memory 310 of the secondary server 105b.

Figure 7:
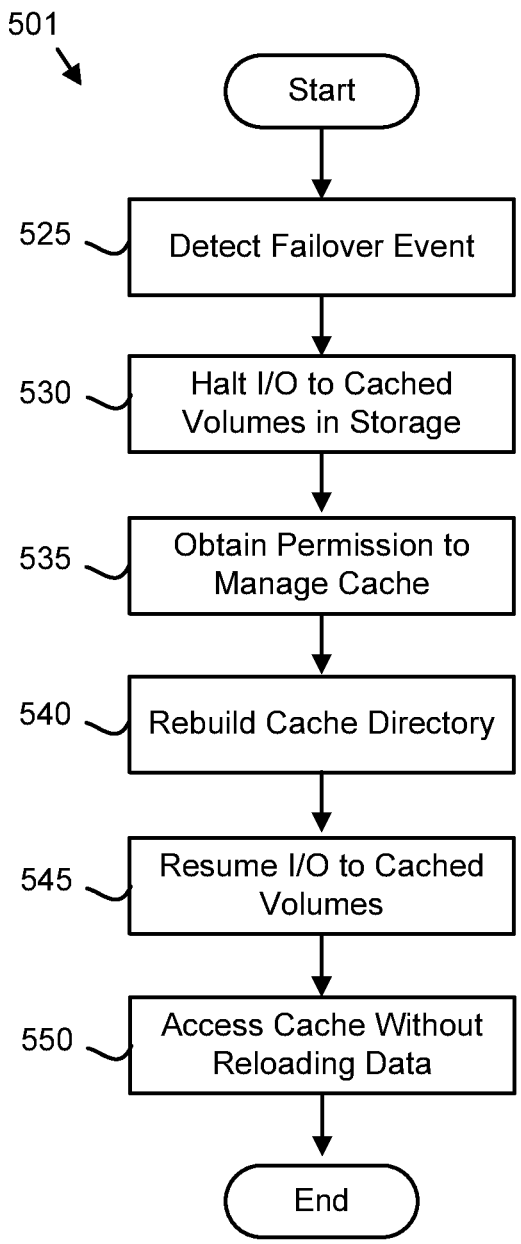
FIG. 7 is a schematic flow chart diagram illustrating one embodiment of a cache directory rebuilding method.

FIG. 7 is a schematic flow chart diagram illustrating one embodiment of a cache directory rebuilding method 501. The method 501 may perform the functions of the cache management apparatus 350 and/or the server cluster 160. The method 501 may be performed by the processor 305. Alternatively, the method 501 may be embodied in a computer program product. The computer program product may include a computer readable storage medium such as the memory 310. The computer readable storage media may have program code embodied therein. The program code may be readable/executable by the processor 305 to perform the functions of the method 501.

The method 501 starts, and in one embodiment, the cache module 355 detects 525 a failover event. The failover event may be a failover from the primary server 105a to the secondary server 105b with the second cache manager 110b of the secondary server 105b becoming the active cache manager 110. Alternatively, the failover event may be a failover from the primary storage system 120a to the secondary storage system 120b with the second cache coherency manager 125b of the secondary storage system 120b becoming the active cache coherency manager 125.

In one embodiment, the cache module 355 halts 530 input/output to cached volumes in the storage systems 120. In one embodiment, the cache module 355 holds the I/O requests in a queue and/or buffer.

The cache module 355 may further obtain 535 permission to manage the cache 115. In one embodiment, the active cache manager 110 communicates the cache coherency token 230 to the active cache coherency manager 125. The active cache coherency manager 125 may validate the cache coherency token 230. In one embodiment, the active cache coherency manager 125 may decrypt the cache coherency token 230 with the encryption key and validate the alphanumeric string and the timestamp of the cache coherency token 230. The active cache coherency manager 125 may further recognize the active cache manager 110 and direct communications regarding cache coherency to the active cache manager 110.

The update module 360 may rebuild 540 the cache directory 200 from data stored in the cache 115. In one embodiment, the active cache manager 110 rebuilds 540 the cache directory 200 using the cache information 205 of the cache directory 200 and/or the data of the cache 115. If the failover event is a failover from the primary storage system 120a to the secondary storage system 120b, the active cache manager 110 may replace the volume identifier 215 for each entry 225 in the cache directory 200 with the corresponding secondary storage system volume identifier.

The update module 360 may resume 545 input/output to cached volumes in the storage systems 120. In one embodiment, the update module 360 allows I/O requests to be processed including I/O requests that had been held in a queue and/or buffer. The update module 360 further accesses 550 the cache 115 without reloading the data of the cache 115 and the method 501 ends.

By obtaining permission to manage the cache 115 by communicating the cache coherency token 230, the embodiments support the rapid use of the cache 115 after a failover event. In particular, the cache 115 may be used without reloading the data stored in the cache 115. As a result, the performance of the server cluster 160 quickly returns to normal levels after the failover event.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a cache module that obtains permission to manage a cache in response to a failover event in a server cluster by communicating a cache coherency token; and
   an update module that rebuilds a cache directory from data stored in the cache and accesses the cache without reloading the data stored in the cache,
   wherein at least a portion of the failover module and the update module comprise one or more of hardware and program code, the program code stored on one or more computer readable storage media.

2. The apparatus of claim 1, wherein the server cluster comprises a primary server, a secondary server, a primary storage system, and a secondary storage system, the primary server accesses data from the primary storage system, the cache caches primary storage system data, and the secondary storage system is synchronized with the primary storage system.

3. The apparatus of claim 2, wherein the cache module further:
   receives the cache coherency token at a first cache manager of the primary server; and
   shares the cache coherency token with a second cache manager of the secondary server.

4. The apparatus of claim 2, wherein the failover event is a failover from the primary server to the secondary server.

5. The apparatus of claim 2, wherein the failover event is a failover from the primary storage system to the secondary storage system.

6. The apparatus of claim 2, wherein the cache module further halts input/output to cached volumes in the primary storage system and the update module resumes input/output to cached volumes in one of the primary storage system and the secondary storage system.

7. The apparatus of claim 1, wherein rebuilding the cache directory comprises replacing a primary storage system volume identifier with a secondary storage system volume identifier for each cache line.

8. A method for a high availability cache comprising:
   obtaining, by use of a processor, permission to manage the cache in response to a failover event in a server cluster by communicating a cache coherency token;
   rebuilding a cache directory from data stored in the cache; and
   accessing the cache without reloading the data stored in the cache.

9. The method of claim 8, wherein the server cluster comprises a primary server, a secondary server, a primary storage system, and a secondary storage system, the primary server accesses data from the primary storage system, the cache caches primary storage system data, and the secondary storage system is synchronized with the primary storage system.

10. The method of claim 9, the method further comprising:
    receiving the cache coherency token at a first cache manager of the primary server; and
    sharing the cache coherency token with a second cache manager of the secondary server.

11. The method of claim 9, wherein the failover event is a failover from the primary server to the secondary server.

12. The method of claim 9, wherein the failover event is a failover from the primary storage system to the secondary storage system.

13. The method of claim 9, the method further comprising:
    halting input/output to cached volumes in the primary storage system; and
    resuming input/output to cached volumes in one of the primary storage system and the secondary storage system.

14. The method of claim 8, wherein rebuilding the cache directory comprises replacing a primary storage system volume identifier with a secondary storage system volume identifier for each cache line.

15. A computer program product for a high availability cache, the computer program product comprising a non-transitory computer readable storage medium having program code embodied therein, the program code readable/executable by a processor to:
    obtain permission to manage the cache in response to a failover event in a server cluster by communicating a cache coherency token;
    rebuild a cache directory from data stored in the cache; and
    access the cache without reloading the data stored in the cache.

16. The computer program product of claim 15, wherein the server cluster comprises a primary server, a secondary server, a primary storage system, and a secondary storage system, the primary server accesses data from the primary storage system, the cache caches primary storage system data, and the secondary storage system is synchronized with the primary storage system.

17. The computer program product of claim 16, the method further comprising:
    receiving the cache coherency token at a first cache manager of the primary server; and
    sharing the cache coherency token with a second cache manager of the secondary server.

18. The computer program product of claim 16, wherein the failover event is a failover from the primary server to the secondary server.

19. The computer program product of claim 16, wherein the failover event is a failover from the primary storage system to the secondary storage system.

20. The computer program product of claim 15, the program code further:
    halting input/output to cached volumes in the primary storage system; and
    resuming input/output to cached volumes in one of the primary storage system and the secondary storage system.

* * * * *